(12) United States Patent
Sågfors et al.

(10) Patent No.: US 8,682,371 B2
(45) Date of Patent: Mar. 25, 2014

(54) METHODS AND ARRANGEMENTS IN A MOBILE TELECOMMUNICATIONS NETWORK

(75) Inventors: Mats Sågfors, Kyrkslätt (FI); Magnus Lindström, Spånga (SE); Janne Peisa, Espoo (FI); Johan Torsner, Masaby (FI); Stefan Wager, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 472 days.

(21) Appl. No.: 12/746,088

(22) PCT Filed: Nov. 10, 2008

(86) PCT No.: PCT/SE2008/051283
§ 371 (c)(1),
(2), (4) Date: Nov. 29, 2010

(87) PCT Pub. No.: WO2009/082333
PCT Pub. Date: Jul. 2, 2009

(65) Prior Publication Data
US 2011/0124360 A1 May 26, 2011

Related U.S. Application Data

(60) Provisional application No. 61/016,057, filed on Dec. 21, 2007, provisional application No. 61/020,868, filed on Jan. 14, 2008.

(51) Int. Cl.
*H04B 7/00* (2006.01)
(52) U.S. Cl.
USPC ............ 455/509; 370/329; 370/437; 714/748

(58) Field of Classification Search
USPC ......................................................... 455/509
See application file for complete search history.

(56) References Cited

U.S. PATENT DOCUMENTS

| 7,480,269 B2* | 1/2009 | Heo et al. ...................... 370/328 |
| 7,486,644 B2* | 2/2009 | Kim et al. ..................... 370/335 |
| 7,613,157 B2* | 11/2009 | Pan et al. ...................... 370/341 |
| 7,693,156 B2* | 4/2010 | Liljestrom et al. ......... 370/395.4 |
| 7,756,087 B2* | 7/2010 | Kim et al. ..................... 370/335 |

(Continued)

FOREIGN PATENT DOCUMENTS

| CN | 1887012 A | 12/2006 |
| EP | 1655909 A | 5/2006 |

OTHER PUBLICATIONS

International Search Report for PCT/SE2008/051283 dated Mar. 31, 2009.

(Continued)

*Primary Examiner* — Hai V Nguyen
(74) *Attorney, Agent, or Firm* — Patent Portfolio Builders PLLC

(57) ABSTRACT

The present invention relates to method and arrangements for using an identifier of a predefined type, e.g. an RNTI identifying one configuration on an out-band control channel for activating the configuration identifiable by that identifier. The identifier is sent from the network to the UE, when a configuration corresponding to that identifier is to be activated. This implies that both the UE and the radio base station comprise a mapping between each configuration and the corresponding identity of each configuration.

18 Claims, 10 Drawing Sheets

(56) References Cited

U.S. PATENT DOCUMENTS

| | | | |
|---|---|---|---|
| 7,792,077 B2* | 9/2010 | Pan et al. | 370/329 |
| 7,801,487 B2* | 9/2010 | Mehrabanzad et al. | 455/63.1 |
| 7,821,977 B2* | 10/2010 | Kim et al. | 370/311 |
| 7,885,293 B2* | 2/2011 | Laroia et al. | 370/468 |
| 7,912,471 B2* | 3/2011 | Kodikara Patabandi et al. | 455/450 |
| 8,009,663 B2* | 8/2011 | Yamada et al. | 370/350 |
| 8,045,513 B2* | 10/2011 | Kim et al. | 370/329 |
| 8,169,953 B2* | 5/2012 | Damnjanovic et al. | 370/329 |
| 8,204,007 B2* | 6/2012 | Terry et al. | 370/329 |
| 8,280,429 B2* | 10/2012 | Huan | 455/522 |
| 8,284,722 B2* | 10/2012 | Park et al. | 370/329 |
| 8,320,319 B2* | 11/2012 | Lohr et al. | 370/437 |
| 8,351,388 B2* | 1/2013 | Chun et al. | 370/329 |
| 8,363,614 B2* | 1/2013 | Kim et al. | 370/329 |
| 8,380,178 B1* | 2/2013 | Dreiling et al. | 455/415 |
| 8,385,273 B2* | 2/2013 | Harada et al. | 370/329 |
| 8,391,311 B2* | 3/2013 | Sung et al. | 370/437 |
| 8,401,542 B2* | 3/2013 | Chung et al. | 455/423 |
| 8,422,425 B2* | 4/2013 | Kimura | 370/328 |
| 8,423,856 B2* | 4/2013 | Cai | 714/748 |
| 8,457,015 B2* | 6/2013 | Ke et al. | 370/254 |
| 8,503,380 B2* | 8/2013 | Meyer et al. | 370/329 |
| 2006/0023629 A1* | 2/2006 | Kim et al. | 370/235 |
| 2006/0062140 A1 | 3/2006 | Sudo | 370/203 |
| 2006/0062182 A1* | 3/2006 | Terry | 370/329 |
| 2006/0092876 A1* | 5/2006 | Kwak et al. | 370/329 |
| 2006/0104242 A1* | 5/2006 | Kim et al. | 370/329 |
| 2006/0114877 A1* | 6/2006 | Heo et al. | 370/342 |
| 2006/0156184 A1* | 7/2006 | Kim et al. | 714/758 |
| 2006/0203772 A1* | 9/2006 | Laroia et al. | 370/329 |
| 2006/0209869 A1* | 9/2006 | Kim et al. | 370/431 |
| 2006/0280142 A1* | 12/2006 | Damnjanovic et al. | 370/329 |
| 2007/0042785 A1* | 2/2007 | Nakamata | 455/450 |
| 2007/0049309 A1* | 3/2007 | Pan et al. | 455/509 |
| 2007/0218901 A1* | 9/2007 | Tenny | 455/436 |
| 2007/0230350 A1* | 10/2007 | Heo et al. | 370/235 |
| 2008/0117891 A1* | 5/2008 | Damnjanovic et al. | 370/345 |
| 2008/0182594 A1* | 7/2008 | Flore et al. | 455/458 |
| 2008/0273610 A1* | 11/2008 | Malladi et al. | 375/260 |
| 2009/0040928 A1* | 2/2009 | Wang et al. | 370/232 |
| 2009/0042576 A1* | 2/2009 | Mukherjee et al. | 455/436 |
| 2009/0103500 A1* | 4/2009 | Malkamaki et al. | 370/336 |
| 2009/0168793 A1* | 7/2009 | Fox et al. | 370/412 |
| 2009/0298524 A1* | 12/2009 | Kuo | 455/509 |
| 2010/0074231 A1* | 3/2010 | Hsu | 370/336 |
| 2010/0088580 A1* | 4/2010 | Chun et al. | 714/807 |
| 2010/0284364 A1* | 11/2010 | You et al. | 370/330 |
| 2011/0019604 A1* | 1/2011 | Chun et al. | 370/312 |
| 2011/0093756 A1* | 4/2011 | Yang et al. | 714/748 |
| 2011/0124360 A1* | 5/2011 | Sagfors et al. | 455/509 |
| 2011/0183700 A1* | 7/2011 | Kodikara Patabandi et al. | 455/509 |
| 2011/0223924 A1* | 9/2011 | Lohr et al. | 455/450 |
| 2011/0243066 A1* | 10/2011 | Nayeb Nazar et al. | 370/328 |
| 2012/0044901 A1* | 2/2012 | Kim et al. | 370/329 |
| 2012/0113831 A1* | 5/2012 | Pelletier et al. | 370/252 |
| 2012/0195267 A1* | 8/2012 | Dai et al. | 370/329 |
| 2013/0010720 A1* | 1/2013 | Lohr et al. | 370/329 |
| 2013/0016676 A1* | 1/2013 | Lohr et al. | 370/329 |
| 2013/0028212 A1* | 1/2013 | Lohr et al. | 370/329 |
| 2013/0114573 A1* | 5/2013 | Suzuki et al. | 370/336 |

OTHER PUBLICATIONS

International Preliminary Report on Patentability for PCT/SE2008/051283 dated Jan. 29, 2010.
Communication pursuant to Article 94(3) EPC from European Patent Office in corresponding European Patent Application No. 08-864-910.8 mailed on Oct. 24, 2011.
Chinese Search Report in corresponding Chinese Application No. 200880123103.X dated Aug. 27, 2012.

* cited by examiner

METHODS AND ARRANGEMENTS IN A MOBILE TELECOMMUNICATIONS NETWORK

TECHNICAL FIELD

The present invention relates to methods and arrangements in a mobile telecommunications network. In particular it relates to configuration of radio resource related configurations.

BACKGROUND

The Universal Mobile Telecommunication System (UMTS) is one of the third generation mobile communication technologies designed to succeed GSM and 3GPP Long Term Evolution (LTE) is a project within the $3^{rd}$ Generation Partnership Project (3GPP) to improve the UMTS standard. UMTS Terrestrial Radio Access Network (UTRAN) is the radio access network of a UMTS system and evolved UTRAN (E-UTRAN) is the radio access network of an LTE system. In UTRAN, the User Equipments (UE) are wirelessly connected to the radio base stations denoted NodeBs (NB) and the NBs are controlled by Radio Network Controllers (RNC). The RNCs are further connected to the core network. However, the radio base stations in E-UTRAN are called evolved NodeB (eNB) and the eNBs are connected directly to the core network.

In UTRAN, each UE is configured with different configurations associated with resource management. Examples of such a configuration are scheduling configuration, MIMO (Multiple Input Multiple Output) configuration, measurement configuration and DRX configuration. Hence, the UE is e.g. given one specific scheduling configuration and the UE should behave in a certain way when it receives a scheduling command based on the scheduling configuration.

In E-UTRAN, it is desired to be able to handle a plurality of configurations associated with the same type of radio resource management. E.g. it would be desired to be able to handle a plurality of scheduling configurations and to switch between the plurality of different scheduling configurations. The existing procedure to reconfigure a single configuration with RRC (radio resource control) procedures would be too slow when more than one configuration is used.

More specifically, there is a need to configure and re-configure multiple configurations in a UE, such that switching between the configurations can be made in a quick manner.

Furthermore, in UTRAN synchronized re-configuration of radio resource related configurations are handled by using an activation time. I.e. an activation time which is a reference to a certain connection frame number (CFN) is included in a radio resource control (RRC) protocol message (which is a higher protocol layer message) in order to assure that the UE starts using the new configuration at the same time instance as the Node B. Since the RRC message may be subject to retransmissions on a lower protocol layer, the activation time must be set far enough into the future to allow for retransmissions of the message. Even if the average retransmission delay is small there are a few percent of the messages that needs several retransmissions. The activation time needs to be set to cover also the worst case which leads to that synchronized re-configuration in UTRAN causes a relatively long delay. It has been a desire in E-UTRAN to avoid these delays.

Another undesirable consequence of the activation time in UTRAN is the fact that the execution of an RRC procedure in the UE may take considerable time. Therefore, in UTRAN RRC, it has been necessary to specify the handling of several parallel ongoing procedures in the UE. This issue has resulted in a lot of complexity in the specifications.

Due to these drawbacks, there is a strong desire to avoid the "activation time solution" in the RRC specification for E-UTRAN.

Examples of RRC configurations that may require synchronization between the UE and the radio base station are scheduling, MIMO parameters, switching of CQI reporting.

SUMMARY

Thus, the object of the present invention is to achieve improved methods and arrangements for managing radio resource related configurations.

The object is achieved by using an identifier of a predefined type identifying one configuration on an out-band control channel for activating the configuration identifiable by that identifier. The identifier is sent from the network to the UE, when a configuration corresponding to that identifier is to be activated. This implies that both the UE and the radio base station comprise a mapping between each configuration and the corresponding identity of each configuration.

According to a first aspect of the present invention a method for a radio network node in a mobile telecommunications network supporting multiple configurations associated with radio resource management is provided. In the method each configuration of the multiple configurations is associated with an identifier of a predefined type, and one configuration is activated by sending, out-band on a downlink control channel, an identifier of the predefined type identifying said configuration to be activated.

According to a second aspect of the present invention a method for a UE in a mobile telecommunications network, wherein the UE is configured to store and use a multiple configurations associated with a radio resource management is provided. In the method each configuration of the multiple configurations is associated with an identifier of a predefined type. It is monitored whether an identifier of the predefined type is received, and when an identifier of the predefined type associated with one of the configurations is received the configuration identified by the received identifier of the predefined type is activated.

According to a third aspect of the present invention a radio network node connectable to a mobile telecommunications network supporting multiple configurations associated with radio resource management is provided. The radio network node comprises a unit for associating each configuration of the multiple configurations with an identifier of a predefined type, and a unit for activating one configuration by sending, out-band on a downlink control channel, an identifier of the predefined type identifying said configuration to be activated.

According to a fourth aspect of the present invention a UE connectable to a mobile telecommunications network, wherein the UE is configured to store and use a multiple configurations associated with a radio resource management is provided. The UE comprises a unit for associating each configuration of the multiple configurations with an identifier of a predefined type. A monitor for monitoring whether an identifier of the predefined type is received is further provided. The UE further comprises a unit for activating the configuration identified by the received identifier of the predefined type when an identifier of the predefined type associated with one of the configurations is received.

An advantage with embodiments of the present invention is that it enables a fast activation of a selected configuration.

A further advantage with embodiments of the present invention is that different scheduling strategies, such as persistent scheduling and bundling can be implemented without introducing excessive signaling burden on the control channel.

A yet further advantage with embodiments of the present invention is that the solution is future proof: No additional extension of PDCCH is needed when new scheduling strategies are introduced. New scheduling strategies can be introduced by enabling those in higher-layer protocols that configure the new solutions.

DETAILED DESCRIPTION

Figure 1:
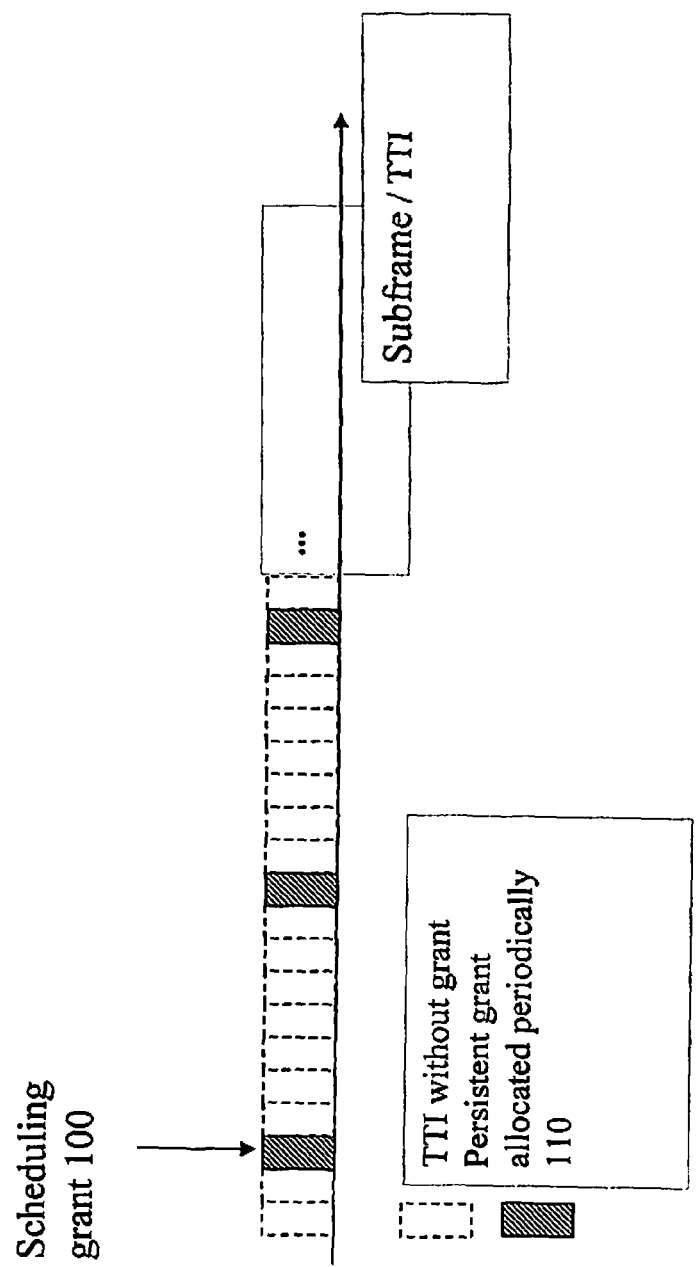
FIG. 1 illustrates one configuration, referred to as persistent scheduling, which embodiments of the present invention can activate.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means, units and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

As stated above, the object with the present invention is to achieve improved methods and arrangements for handling a plurality of radio resource related configurations. The object is achieved by using an identifier of a predefined type identifying one configuration on an out-band control channel for activating the configuration identifiable by that identifier. This implies that both the UE and the radio base station comprise a mapping between each configuration and the corresponding identity of each configuration. The predefined type may be an RNTI (Radio Network Temporary Identifier) and the out-band control channel may be the PDCCH (Physical Downlink Control Channel) In E-UTRAN. E.g., each scheduling configuration may be associated with a specific RNTI, wherein a scheduling configuration is activated when its associated RNTI is detected on the PDCCH. This results in that it is possible to quickly switch between different configurations. The configurations and their respective associations with the identities of the predefined type may be predefined in the UE and in the network, transmitted to the UE from the network, e.g. via an RRC message, broadcasting or included in a Random Access Response.

The present invention is further explained by the following embodiment wherein the UE is configured with a radio resource configuration A and the radio base station transmits a message, e.g. an RRC message, comprising at least a secondary radio resource configuration B. The UE then has one primary configuration A, and at least one secondary configuration B. The UE responds with an acknowledgement (e.g. an RRC re-configuration complete message on layer 3 or a layer confirmation in form of an acknowledgement on layer 2 or layer 3) if the message with the secondary configuration is received correctly and the UE is prepared to use the configurations sent in the message. The radio base station activates one of the configurations A and B by sending out-band an identifier indicating configuration A or B on a control channel. As stated above, the identifier may be a RNTI (Radio Network Temporary Identifier) and the control channel may be a PDCCH (Physical Downlink Control Channel). The transmission of the RNTI identifying configuration A or B, has the function of a scheduling command on the PDCCH, wherein the RNTI may be implicitly coded into the CRC (Cyclic Redundancy Check) checksum. When the UE detects an RNTI intended for that UE identifying one of the configurations A or B, the UE interprets the detection of the RNTI as a scheduling grant and the configuration identified by the RNTI is activated. The eNB and the UE start using the activated configuration in the same TTI as a sent/received grant/assignment is valid for (or if needed, the configuration is taken into use a fixed number of sub frames thereafter).

Since the network can send the indication of the configuration to be activated on the fast control channel, e.g. the PDCCH, immediately after a L2 or L3 acknowledgement has been received for e.g. a RRC re-configuration message the procedure only suffers from retransmission delays in the case they actually occur. Thus the average reconfiguration delay is much less than a procedure using activation times.

As stated above, the predefined type, is according to one embodiment a RNTI, sent in a RRC message on the downlink control channel PDCCH. With two identifier bits on the PDCCH, four different configurations can be configured via the RRC (in one or several RRC messages). The identifier sent on the PDCCH can then be used to quickly switch between these configurations in a synchronized manner, which implies that the eNB and the UE start using the configuration at the same time. No additional RRC procedures are required.

It should also be noted that the solution according to the embodiments of the present invention are generic in the sense that they are independent of what aspect that differs between the configurations. For example, if only two configurations are configured in the UE, the first configuration could be single-antennas with persistent scheduling, whereas the second could be MIMO-antennas without persistent scheduling. Other combinations or functional differences between configurations could apply, including e.g. MIMO configuration, Measurement configuration, DRX configuration and scheduling configurations. Examples include MIMO configurations, where one configuration is configured for e.g. spatial multiplexing, and another for transmit diversity. Multiple measurement configurations could include different configurations for mobility measurements including different threshold levels that could be activated according to the present invention. Variations in DRX could be achieved by configuring multiple DRX configurations where multiple sets of parameters defining the DRX behavior is configured—one optimizing e.g. response time over battery consumption, and vice versa.

Regarding synchronized activation of scheduling configurations, in the regular scheduling configuration both the uplink and downlink are scheduled by the eNB in e-UTRAN and the scheduling commands are sent on the Physical Downlink Control Channel (PDCCH). There is an indication on the PDCCH whenever a UE is scheduled on the uplink or downlink shared channels, the Uplink shared channel (UL-SCH) or the downlink shared channel (DL-SCH), respectively. Regular uplink scheduling implies that the UE receives a scheduling command (grant) valid for a predetermined subsequent Transmission Time Interval (TTI). The information in the scheduling commands on the PDCCH for the regular scheduling includes information related to:

The radio resource (resource blocks), i.e. where the UE should read (in the DL) or send (in the UL) the data, Coding, redundancy version, transport block size, etc., such that the UE knows both "where" and "how" to send/receive data on the UL/DL shared channels, respectively. The details of the information on PDCCH is very similar to e.g. HS-DSCH in UTRAN, where HS-SCCH carries this outband information needed for correct interpretation of a transmission scheduled on the High-speed physical downlink shared channels HS-PDSCH.

In scheduled transmissions, a UE identity, the RNTI, of a scheduled transmission must also be conveyed on the outband control channel (HS-SCCH in UTRAN DL, and PDCCH in E-UTRAN) to identify which UE the transmission is intended for. In UTRAN this identity is not explicitly transmitted, but implicitly included in the CRC calculation and the HS-SCCH channel coding.

The aforementioned identity must be unique for the UE, in case only a single UE is scheduled. In UTRAN, this DL (HS-DSCH) identity is called HS-RNTI, while uplink (E-DCH) scheduling is based on an E-RNTI (RNTI—Radio Network Temporary Identity).

In E-UTRAN, the current abbreviation for the unique UE identity is C-RNTI, where "C" reflects that this UE identity is unique for the UE in this cell.

In the following, E-UTRAN is used as a particular example for embodiments of the present invention. It should be clear however, that all following embodiments of the present invention are applicable to any radio networks with similar characteristics, where data is scheduled on a channel shared by many UEs.

As already noted, the scheduling of a UE in E-UTRAN is the responsibility of the eNB—both in the uplink and the downlink:

In the downlink, information on the PDCCH is sent in parallel with the data on the DL-SCH, such that the correct UE can decode the data correctly.

In the uplink, information on the PDCCH is sent prior to the event when the UE should send its data on UL-SCH, such that the UE can encode and transmit the data correctly.

Hence, embodiments of the present invention may be used to manage and to activate different scheduling configurations such as regular scheduling as described above and scheduling methods referred to as "Persistent Scheduling" or "Semi-Persistent Scheduling". With (semi)persistent scheduling, the desire is to reduce the amount of traffic on the PDCCH control channel by issuing scheduling grants 100 that have a validity spanning over several TTIs 110. These multiple TTIs for which the persistent grant is valid could occur periodically, e.g. every 20 ms, which may be particularly useful e.g. for Voice over Internet Protocol (VoIP) traffic. Alternatively, a persistent grant could span several consecutive TTIs. Hence, a persistent scheduling configuration may indicate the periodicity of the persistent scheduling.

Persistent scheduling where the grant is valid periodically is shown in FIG. 1.

Thus, by using embodiments of the present invention a cost-efficient solution for indicating if a scheduling grant issued and signaled on a downlink out-band control channel (e.g. PDCCH) is valid only for a single TTI (regular scheduling), or if the validity of the grant is persistent, i.e. if the validity of the grant spans over several TTIs.

This is achieved by using one or several additional identities of the predefined type. The predefined type is according to embodiments of the present invention the Radio Network Temporary Identifiers (RNTIs), which are sent on the outband control channel, such that different "scheduling methods" are applicable depending on which of the RNTIs are used in the scheduling, and where the RNTI is conveyed on the out-band channel, e.g. the PDCCH.

Accordingly, persistent scheduling may be scheduled with an RNTI different from the RNTI used for regular scheduled transmissions and another scheduling method is scheduled with a further RNTI different from the RNTI used for regular scheduled transmissions.

Further embodiments include the solutions where the RNTIs and the scheduling strategy associated with the RNTI are configured using upper layer protocols. I.e. upper layer protocols provide a mapping between each scheduling method and a corresponding RNTI, which both the UE and the radio base station should be aware of.

Moreover, the upper layer protocol configuring the RNTIs and the associated scheduling methods, i.e. the transmission of the configuration(s) from the eNB to the UE, may be RRC or Medium Access Control (MAC). The configuration can be UE specific or common to several UEs (typically all UEs within a cell; i.e., cell wide) or a combination thereof (e.g., UE specific RNTI associated with a cell wide scheduling method configuration). The UE specific configuration is typically performed by means of dedicated signaling whereas the cell wide configuration is typically performed by means of broadcasting or signaling on a common channel. A default configuration can also be provided by the specification.

Further, embodiments of the present invention also concern a UE, where the UE is configured with multiple radio resource configurations such as multiple scheduling methods and is configured to monitor several identities of the predefined type, e.g. RNTIs. If the UE is configured by upper layers, the UE acts according to the different scheduling methods depending on which of the identities of the predefined type that is detected in association with the scheduling command on the out-band control channel.

In E-UTRAN, the out-band control channel is a PDCCH channel and the RNTIs are C-RNTIs and the scheduled data is carried on the DL-SCH or UL-SCH.

In UTRAN, the out-band control channel is an out control channel in UTRAN, the RNTIs are HS-RNTIs or E-RNTIs, and the data is carried on the HS-DSCH or E-DCH.

The above described embodiments are illustrated by the following examples in an E-UTRAN scenario, where the predefined type is the C-RNTI and the out-band control channel is a PDCCH. Assume first an UE that is connected to an eNB in RRC CONNECTED state. According to existing art, in this RRC CONNECTED state, the UE has a unique C-RNTI in the cell, such that any scheduling commands issued by the eNB can be uniquely addressed to this UE. This regular scheduling method is referred to as "Scheduling Method A". The state-of-the-art scenario is illustrated in FIG. 2.

Figure 2:
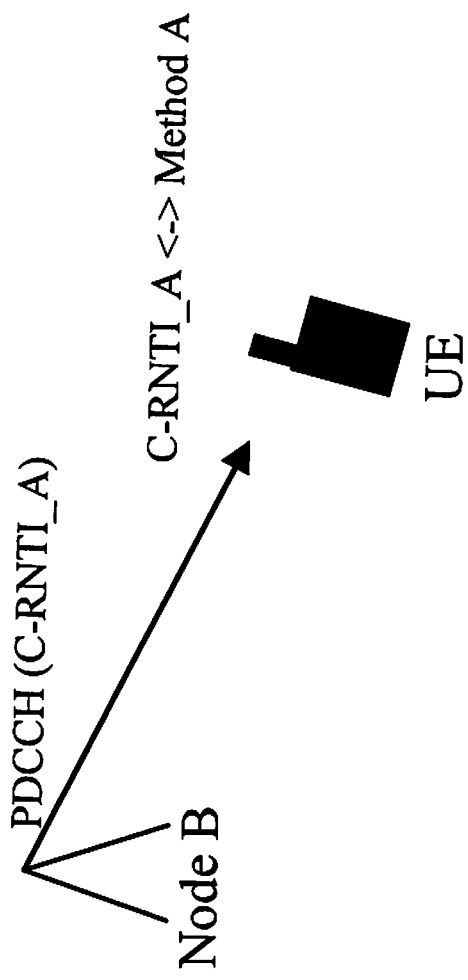
FIG. 2 illustrates a regular scheduling method according to prior art.

In FIG. 2, a C-RNTI_A has been assigned to the UE using higher layer signaling. The UE then monitors the PDCCH channel, and if it identifies its assigned C-RNTI identity on the PDCCH as illustrated in FIG. 2, then the UE obeys the scheduling commands according to Method A. The scheduling command may be transmitted from the eNB in a downlink transmission.

Now, according to one embodiment of the present invention, at least a second identity of the predefined type is used, where the second identity identifies a different scheduling method. In this case, an additional C-RNTI is assigned to the UE, wherein the additional C-RNTI may imply that the UE should obey the scheduling commands according to a Method B.

For example, there may be desired to set up a VoIP connection, for which persistent scheduling (scheduling method B) could be beneficial. Alternatively, it may be identified that the terminal is moving into an area of bad coverage, for which another scheduling method B would be beneficial. Regardless of the desired scheduling method, the radio base station now sets up a second RNTI (C-RNTI_B) that identifies the "Scheduling Method B", as illustrated in FIG. 3.

Figure 3:
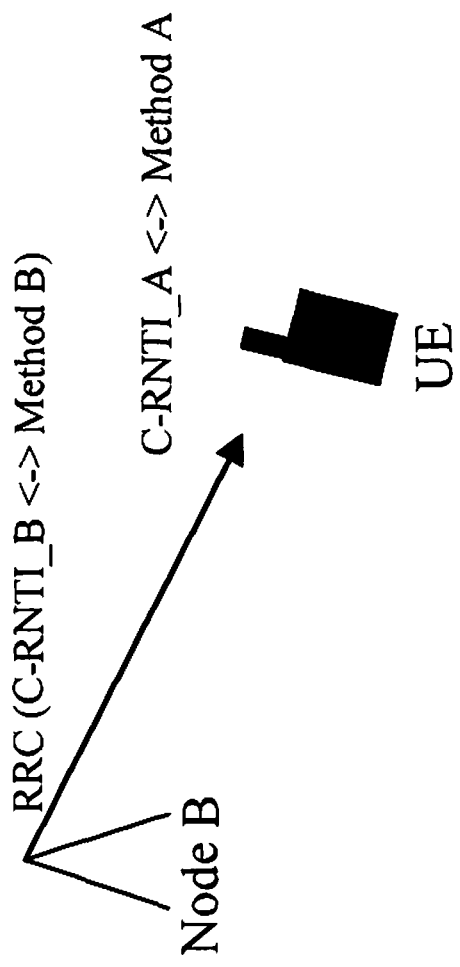
FIG. 3 illustrates how the radio base station sets up a second RNTI identifying a scheduling method according to embodiments of the present invention.

In FIG. 3, the second scheduling method B is configured using RRC signaling, where method B is now associated with a C-RNTI_B. In addition to the now illustrated two RNTIs and corresponding two scheduling methods, additional RNTIs and corresponding scheduling methods may be configured. Examples of scheduling methods are "Semi-Persistent Scheduling" and other scheduling methods such as transmission bundling, or different antenna configurations associated with each scheduling method.

Figure 4:
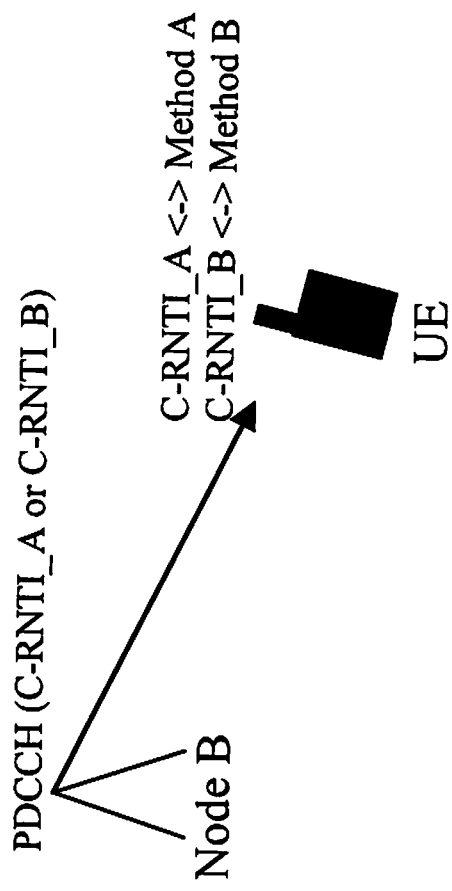
FIGS. 4-7 illustrate further embodiments of the present invention.

The UE has now received two configurations and associations of the respective scheduling method with the respective C-RNTI. As a consequence, the UE listens to the PDCCH out-band control channel, and acts in accordance with the configured Scheduling Method A if the first RNTI (C-RNTI_A) is identified, and according to Scheduling Method B if the second RNTI (C-RNTI_B) is identified as illustrated in FIG. 4.

For example, if Method B is "Semi-Persistent Scheduling", if the UE identifies a scheduling command in PDCCH associated with C-RNTI_B, then the UE should obey the scheduling rules for persistent scheduling and send or receive data according to the method illustrated in FIG. 1.

Hence, in order to alternate between different scheduling methods different C-RNTIs are sent on the PDCCH as scheduling commands. Details on how the scheduling command associated with the C-RNTI should be interpreted are configured via higher layers (preferably RRC or MAC). These details may e.g. include:

Periodicity of the grant, i.e. a grant that is valid once every configured TTI or HARQ process.

Number of consecutive TTIs for which the grant is valid.

Indication about if the UE should transmit Hybrid Automatic Repeat Request (HARQ) feedback after each scheduled TTI or only send feedback after a configured number of TTIs.

Indication about if the UE should expect and act on received HARQ feedback after each scheduled TTI or only expect and act on received HARQ feedback after a configured number of TTIs.

For the case where the grant is valid for several TTIs, and indication about if different data (MAC PDUs) should be transmitted in each TTI or if the same data (MAC PDU) should be transmitted (repeated) potentially with different physical layer coding such as redundancy version.

With respect to other information sent on the PDCCH, such as radio resource blocks, modulation scheme, transport block size, etc. the UE may obey common rules for both a first method and a second method, or the UE may obey different rules depending on the configuration issued by upper layers. Hence, the UE may interpret the bits on PDCCH differently depending on the identified RNTI and the corresponding configuration.

The solution is applicable both for UL transmissions on UL-SCH, as well as DL transmissions on DL-SCH.

While the preceding and examples have assumed a UE in RRC_CONNECTED state, embodiments of the present invention is also applicable to a UE which is not in RRC_CONNECTED state; in particular, but not limited to, to a UE prior to entering RRC_CONNECTED state and, hence, prior to having a unique C-RNTI.

Figure 5:
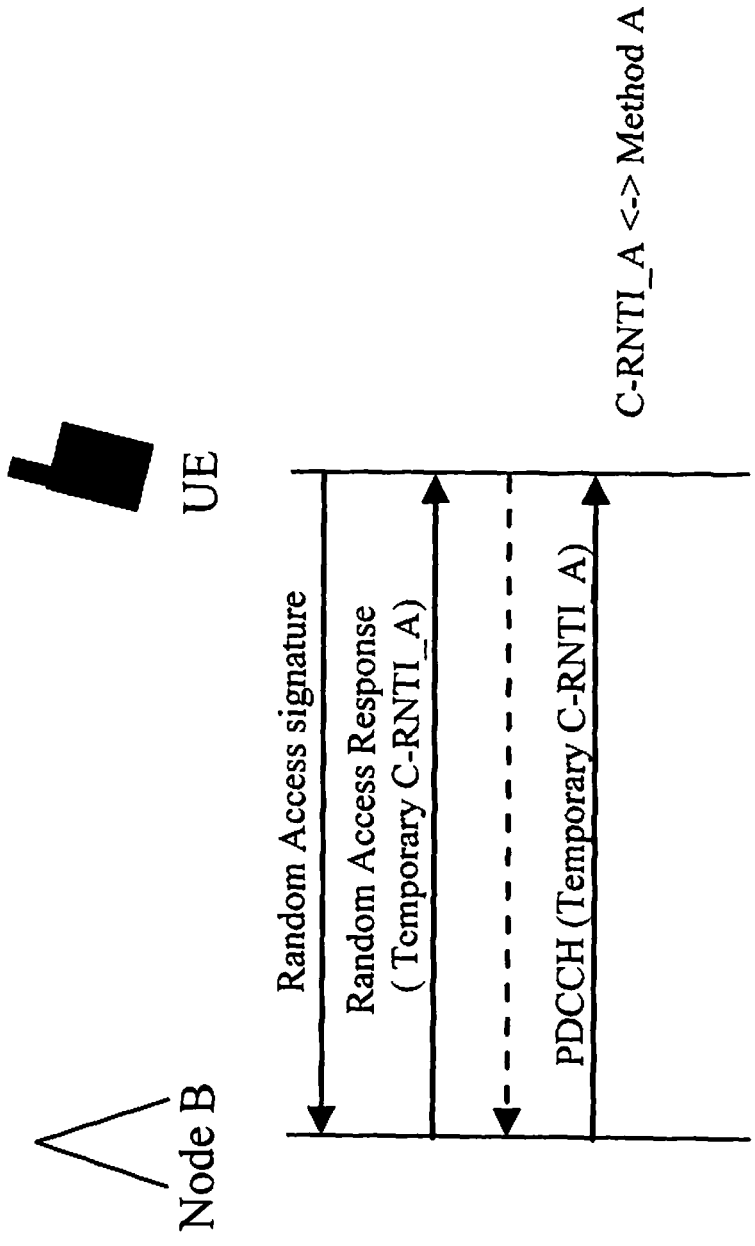

In order to obtain a unique C-RNTI and enter RRC_CONNECTED state, in E-UTRAN, a Random Access procedure is executed where the UE first transmits a Random Access signature. When the eNB detects this signature, the eNB responds with a Random Access Response which assigns to the UE a Temporary C-RNTI which is dependent on the Random Access response; illustrated in FIG. 5. Multiple UEs may have transmitted the same Random Access signature and will consequently receive the same Random Access Response. Thus, the Temporary C-RNTI may not be unique to a particular UE since it may have been received by multiple UEs. If it is determined that two or more UEs receive the same C-RNTIs, then multiple UEs will assume ownership of the same temporary identity. In their first UL L3 message, both UEs will reveal a longer, unique identity that is mirrored back in the following response from the eNB. A UE that does not find its own long identity in this response must back off, and start a new RA procedure until it finds its own long identity in the response.

Figure 6:
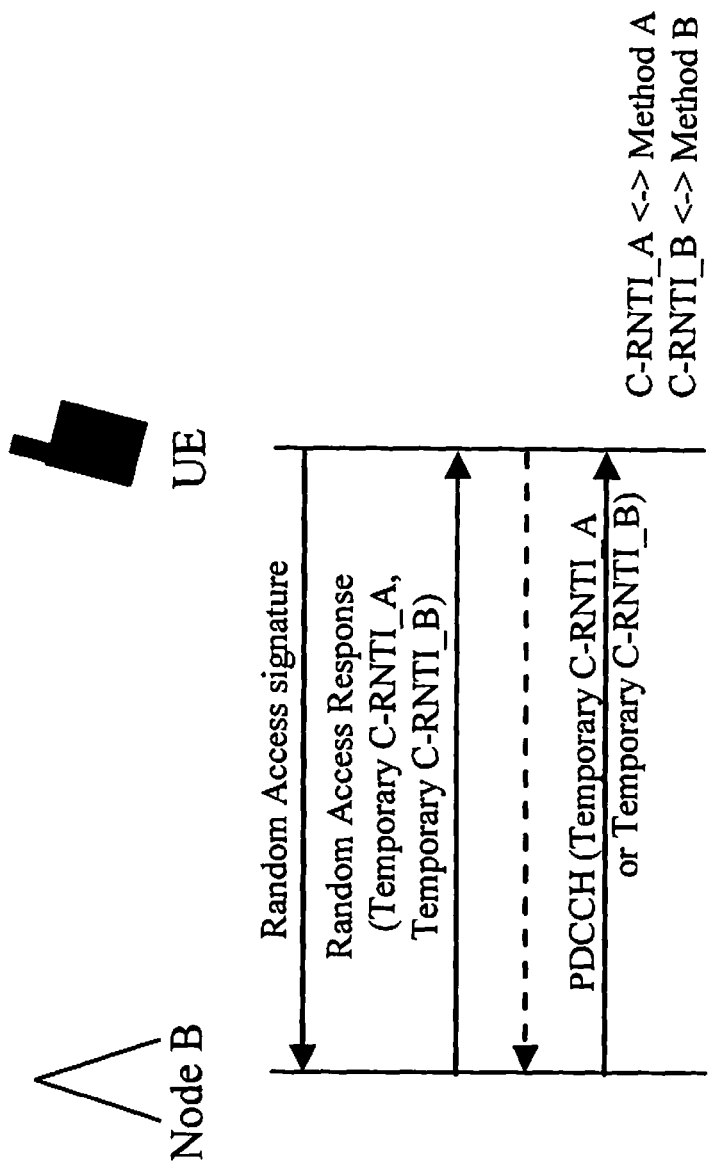

As mentioned above, embodiments of the present invention also concern the method to reduce delay and signaling overhead by means of assigning and configuring multiple identities such as Temporary C-RNTIs or C-RNTIs with the Random Access Response or other upper layer signaling. An example of this is provided in FIG. 6.

The Temporary C-RNTI and C-RNTI assignments can be compressed by indicating a set of values relative to a base Temporary C-RNTI_0 or C-RNTI_0:

$$C\text{-}RNTI\_i = f(C\text{-}RNTI\_0, N_i)$$

The set can, e.g., be a contiguous range of values or a non-contiguous set of values according to some rule (signaled or given by the specification). For example:

$$C\text{-}RNTI\_A = C\text{-}RNTI\_0$$

$$C\text{-}RNTI\_B = C\text{-}RNTI\_A + 1$$

The base value can be indicated with the assignment or be predefined. For each additional Temporary C-RNTI or C-RNTI only $N_i$ needs to be indicated.

Figure 7:
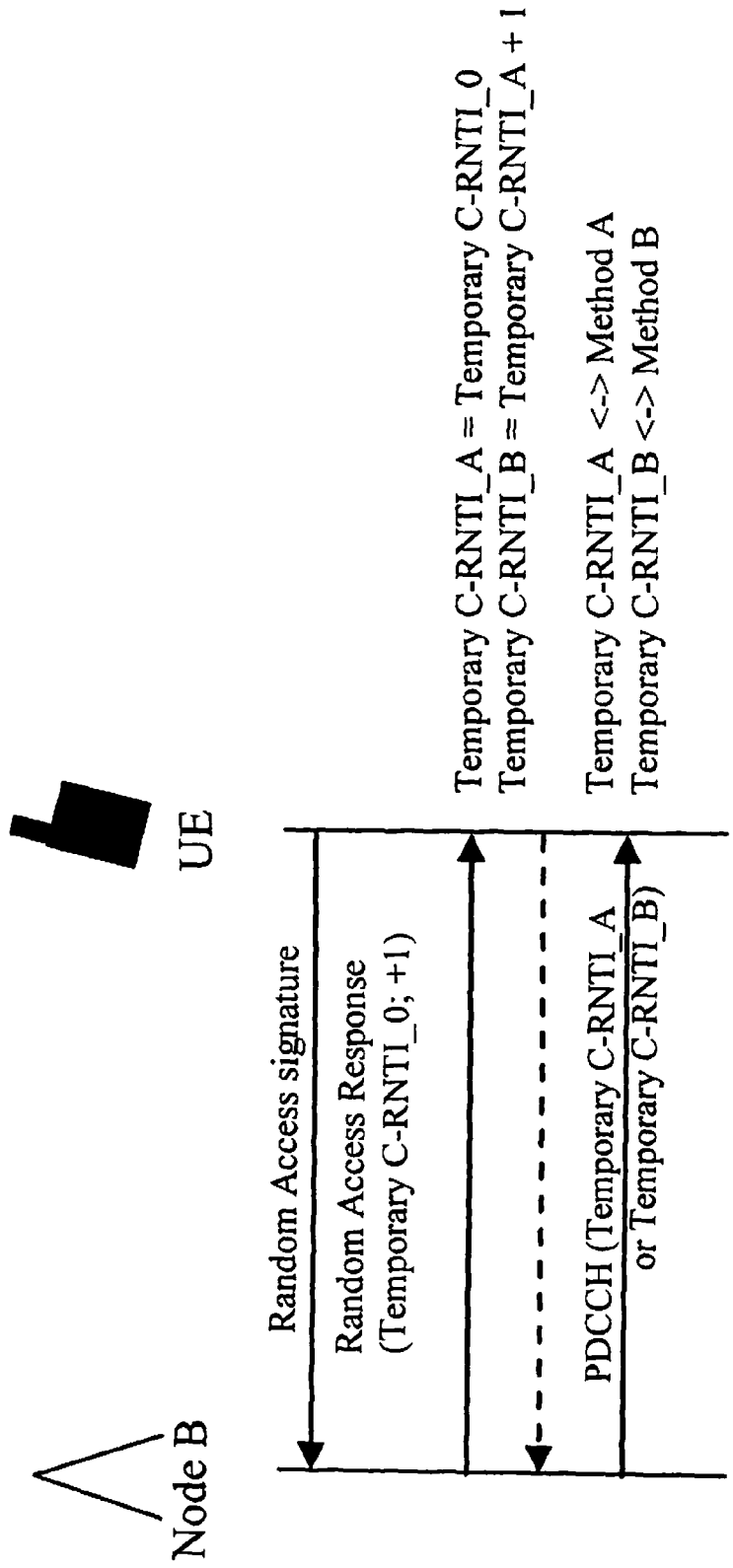

For the case where $N_i = i$, the $N_i$s need not be signaled individually and the assignment can be further compressed by, instead of the $N_i$s, indicating only the number of additional Temporary C-RNTIs or C-RNTIs. An example is provided in FIG. 7.

The E-UTRAN supports promoting or converting the Temporary C-RNTI into a C-RNTI as stated above. A C-RNTI resulting from such a promotion or conversion can inherit the configuration associated with the Temporary C-RNTI or be reconfigured by upper layers.

The figures relates to E-UTRAN. However, the solution is equally applicable to other systems such as UTRAN, where the identities are HS-RNTI, E-RNTI, and the control channels are e.g. HS-SCCH, E-AGCH, E-RGCH, and the data transport channels carrying the data-part are HS-DSCH and E-DCH, respectively.

Thus, by using the temporary C-RNTIs for indicating that a new configuration should be activated, multiple configurations may be configured at setup, such that switching between the configurations could start directly after assigning the RNTIs according to the embodiments of the present invention.

The radio base station may also transmit a message indicating at least two radio resource configurations related to a radio resource configuration, e.g. configuration A and configuration B. The indication on the out-band downlink control channel is only a single indication bit which is toggled when a new configuration should be taken into use. As an extension: If the indication bit is toggled when no new configuration message has been received the UE toggles back to the previous configuration. Two different configurations can be pre-configured via the RRC protocol mapped to one indication value respectively and the indication sent on the PDCCH can indicate a switch between them.

Figure 8:
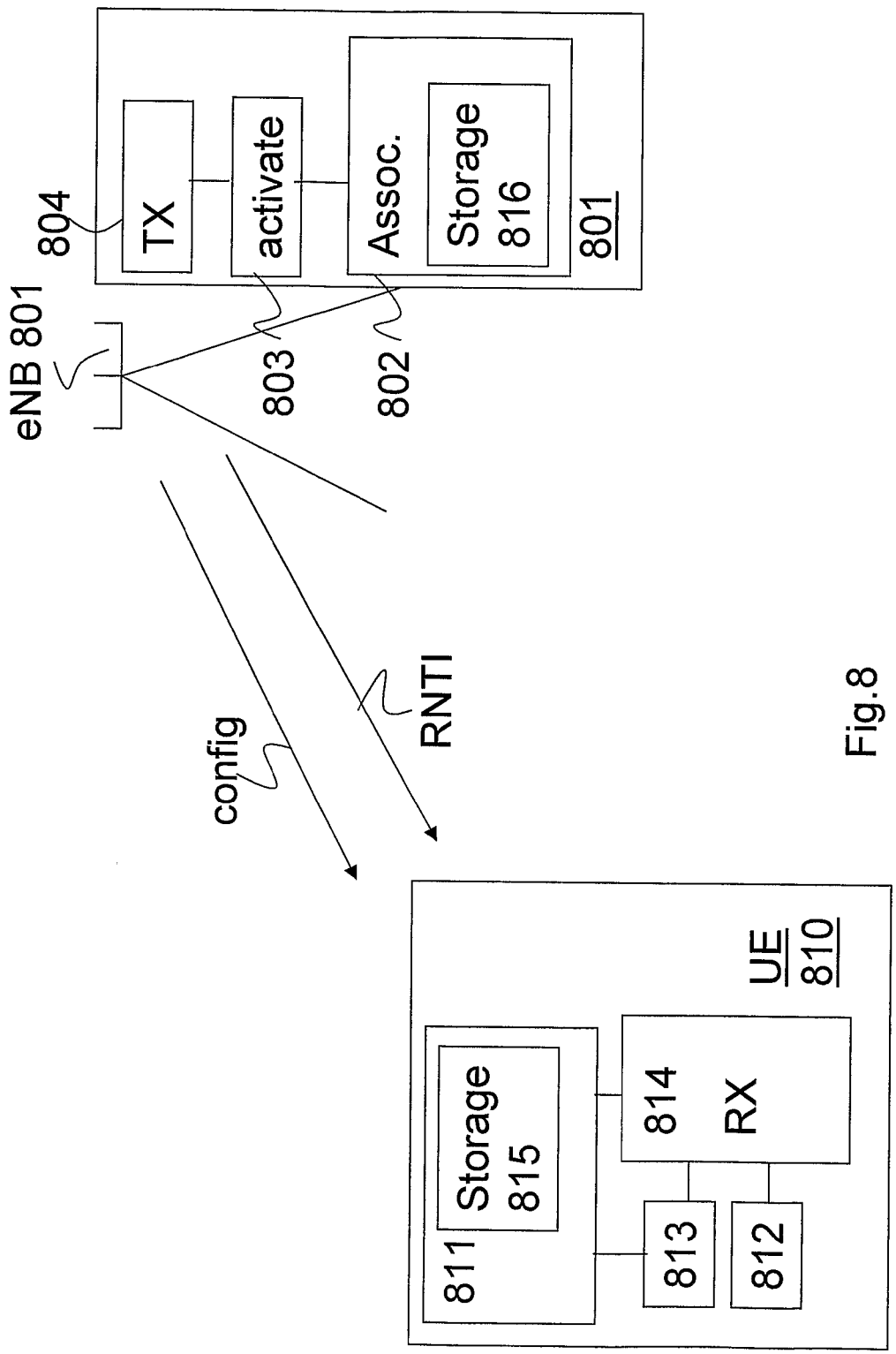
FIG. 8 illustrates a UE and a radio base station according to embodiments of the present invention.

Turning now to FIG. 8, showing a UE and a radio base station according to an embodiment of the present invention.

The radio base station 801 is connectable to a mobile telecommunications network supporting multiple configurations associated with radio resource management. The radio base station 801 comprises a unit 802 for associating each configuration of the multiple configurations with an identifier of a predefined type. A storage 816 for storing these associations may be provided in connection with the unit 802 for associating configurations with corresponding identifiers. The configurations may be sent to the UE via a transmitter 804. Furthermore, a unit 803 for activating one configuration by sending by means of the transmitter 804 an identifier of the predefined type identifying said configuration to be activated is provided. The identifier is sent outband on a downlink control channel.

Moreover, a UE 810 connectable to the mobile telecommunications network via the radio base station 801 is provided as illustrated in FIG. 8. The UE is configured to store 815 and use a multiple configurations associated with a radio resource management. The UE comprises a unit 811 for associating each configuration of the multiple configurations with an identifier of a predefined type, a monitor 812 for monitoring whether an identifier of the predefined type is received by the receiver 814, and a unit 813 for activating the configuration identified by the received identifier of the predefined type when an identifier of the predefined type associated with one of the configurations is received. The configurations may e.g. be received by the receiver 814 in an RRC message or predefined and stored in a memory 815.

Figure 9:
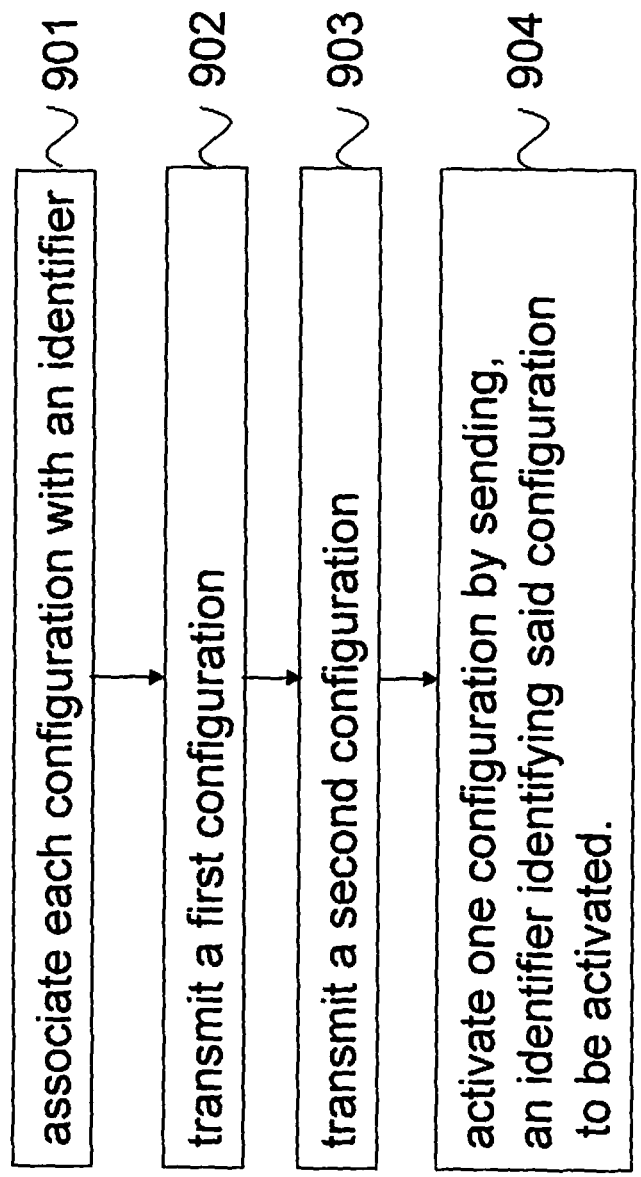
FIGS. 9-10 are flowcharts of the methods according to embodiments of the present invention.

FIG. 9 is a flowchart of a method in the radio base station according to an embodiment of the present invention. In step 901, each configuration is associated with an identifier. A plurality of configurations is then sent to the UE 902, 903, and possibly also the association to the corresponding identifiers. When the radio base station wants to activate 904 one configuration, it sends an identifier corresponding to the configuration to be activated to the UE.

Figure 10:
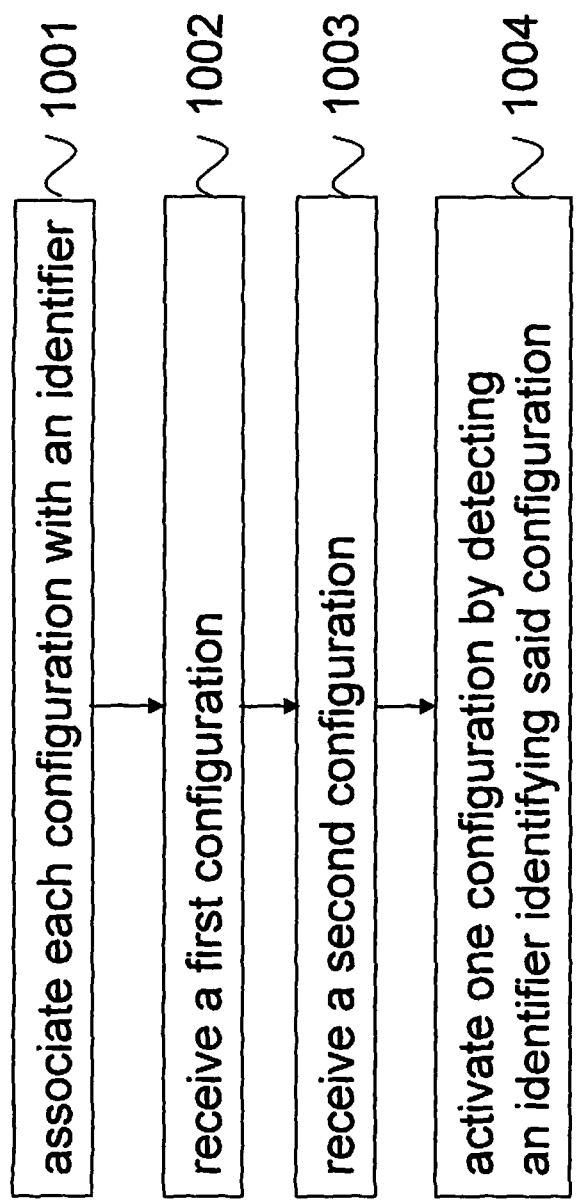

FIG. 10 is a flowchart of a method in the UE according to an embodiment of the present invention. In step 1001, each configuration is associated with an identifier. That can be achieved by receiving the association from the radio base station. A plurality of configurations is then received from the radio base station 1002, 1003. When the radio base station wants to activate one configuration, it sends an identifier corresponding to the configuration to be activated to the UE and when the UE detects said identifier the configuration can be activated 1005.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for a radio network node in a mobile telecommunications network supporting multiple configurations associated with radio resource management, the method comprising the steps of:
    associating each configuration of the multiple configurations with a radio network temporary identifier, RNTI;
    transmitting at least one configuration among the multiple configurations to a user equipment, UE, wherein the at least one configuration is identifiable by a respective RNTI; and
    activating one configuration by sending to the UE, on an out-of-band downlink control channel, an RNTI identifying said one configuration to be activated, wherein each of the multiple configurations specifies a different scheduling method comprising a number of scheduling rules that govern how the UE is to interpret a scheduling command received on the out-of-band downlink control channel.

2. The method according to claim 1, wherein the out-of-band downlink control channel is a Physical Downlink Control Channel, PDCCH.

3. The method according to claim 1, wherein assignments of RNTIs are compressed by indicating a set of RNTIs values relative to a base RNTI.

4. The method according to claim 1, comprising the further step of:
    transmitting an additional configuration associated with radio resource management, wherein the additional configuration is identifiable by an additional RNTI.

5. The method according to claim 1, wherein the at least one configuration and corresponding identifier are transmitted in an RRC message.

6. The method according to claim 1, wherein the configuration is a persistent scheduling configuration.

7. The method of claim 1, wherein the transmitting of the at least one configuration to the UE includes transmitting an associated RNTI identifying said at least one configuration to the UE.

8. A method for a user equipment, UE, in a mobile telecommunications network, wherein the UE is configured to store and use multiple configurations associated with a radio resource management, the method comprises the steps of:
    associating each configuration of the multiple configurations with a radio network temporary identifier, RNTI;
    receiving, from a radio network node, at least one configuration associated with radio resource management, wherein the at least one configuration is identifiable by a respective RNTI; and
    monitoring whether an RNTI is received on an out-of-band downlink control channel, and when an RNTI associated with one of the configurations is received:
    activating the configuration identified by the received RNTI, wherein each configuration specifies a different scheduling method comprising a number of scheduling rules that govern how the UE is to interpret a scheduling command received on the out-of-band downlink control channel.

9. The method according to claim 8, wherein assignments of RNTIs are compressed by indicating a set of RNTIs values relative to a base RNTI.

10. The method according to claim 8, comprising the further step of:
   receiving an additional configuration associated with radio resource management, wherein the additional configuration is identifiable by an additional RNTI.

11. The method according to claim 8, wherein the at least one configuration and corresponding identifier are received in an RRC message.

12. The method according to claim 8, wherein the configuration is a persistent scheduling configuration.

13. A radio network node connectable to a mobile telecommunications network supporting multiple configurations associated with radio resource management comprising:
   a unit for associating each configuration of the multiple configurations with a radio network temporary identifier, RNTI;
   a transmitter for transmitting at least one configuration associated with radio resource management, wherein the at least one configuration is identifiable by a respective RNTI; and
   a unit for activating one configuration by sending, out-band on a downlink control channel, an identifier of the predefined type identifying said configuration to be activated, wherein each configuration specifies a different scheduling method comprising a number of scheduling rules that govern how a user equipment, UE, is to interpret a scheduling command received on the downlink control channel.

14. The network node according to claim 13, wherein assignments of RNTIs are compressed by indicating a set of RNTIs values relative to a base RNTI.

15. The network node according to claim 13, wherein the configuration is a persistent scheduling configuration.

16. A User Equipment, UE, connectable to a mobile telecommunications network, wherein the UE is configured to store and use multiple configurations associated with radio resource management, the UE comprises:
   a unit for associating each configuration of the multiple configurations with a radio network temporary identifier, RNTI, wherein the unit for associating comprises a receiver for receiving at least one configuration associated with radio resource management and wherein the at least one configuration is identifiable by a respective RNTI;
   a monitor for monitoring whether an RNTI is received; and
   a unit for activating the configuration identified by the received RNTI when an RNTI associated with one of the configurations is received, wherein each configuration specifies a different scheduling method comprising a number of scheduling rules that govern how the UE is to interpret a scheduling command received on the downlink control channel.

17. The UE according to claim 16, wherein assignments of RNTIs are compressed by indicating a set of RNTIs values relative to a base RNTI.

18. The UE according to claim 16, wherein the configuration is a persistent scheduling configuration.

* * * * *